(12) United States Patent
Ikeda et al.

(10) Patent No.: US 12,431,580 B2
(45) Date of Patent: Sep. 30, 2025

(54) EXTERNAL CONNECTION BUS BAR AND WIRING MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shuya Ikeda, Osaka (JP); Osamu Nakayama, Osaka (JP); Katsushi Miyazaki, Osaka (JP); Mitsutoshi Morita, Osaka (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 204 days.

(21) Appl. No.: 18/271,571

(22) PCT Filed: Dec. 28, 2021

(86) PCT No.: PCT/JP2021/048781
§ 371 (c)(1),
(2) Date: Jul. 10, 2023

(87) PCT Pub. No.: WO2022/153871
PCT Pub. Date: Jul. 21, 2022

(65) Prior Publication Data
US 2024/0072367 A1    Feb. 29, 2024

(30) Foreign Application Priority Data
Jan. 15, 2021   (JP) .................................. 2021-004681

(51) Int. Cl.
     *H01M 50/298*     (2021.01)
     *H01B 5/02*        (2006.01)
     (Continued)

(52) U.S. Cl.
     CPC ............. *H01M 50/298* (2021.01); *H01B 5/02* (2013.01); *H01M 50/519* (2021.01); *H01R 12/59* (2013.01)

(58) Field of Classification Search
None
See application file for complete search history.

(56) References Cited

U.S. PATENT DOCUMENTS 10,367,183 B2 *   7/2019   Sekine ................. H01M 50/519
2019/0355959 A1 *   11/2019   Ro ....................... H01M 10/425
(Continued)

FOREIGN PATENT DOCUMENTS

EP      2 894 695      7/2015
EP      3 792 996      3/2021
(Continued)

OTHER PUBLICATIONS

International Search Report issued in WIPO Patent Application No. PCT/JP2021/048781, dated Feb. 15, 2022, along with an English translation thereof.

*Primary Examiner* — Krystal Robinson
(74) *Attorney, Agent, or Firm* — GREENBLUM & BERNSTEIN, P.L.C.

(57) ABSTRACT

An external connection bus bar to be connected to a storage element group having a plurality of storage elements and having an output electrode terminal for outputting electric power to an external circuit includes a main body portion to be connected to the output electrode terminal, an external connection terminal to be connected to an external circuit, and a circuit board connection portion to be soldered to a bus (Continued)

bar land provided on the circuit board. The external connection terminal is provided between the main body portion and the circuit board connection portion.

7 Claims, 6 Drawing Sheets

(51) Int. Cl.
*H01M 50/519* (2021.01)
*H01R 12/59* (2011.01)

(56) References Cited

U.S. PATENT DOCUMENTS

2023/0226929 A1\* 7/2023 Kunimitsu ............... B60L 50/64
  180/65.1
2023/0247760 A1\* 8/2023 Matsumura .......... H05K 1/0277
  361/749

FOREIGN PATENT DOCUMENTS

| | | |
|---|---|---|
| JP | 2013-105522 | 5/2013 |
| JP | 2019197661 | \* 11/2019 |
| KR | 10-2016-0055616 | 5/2016 |
| KR | 10-2017-0021698 | 2/2017 |
| WO | 2019/216218 | 11/2019 |

\* cited by examiner

EXTERNAL CONNECTION BUS BAR AND WIRING MODULE

TECHNICAL FIELD

The present disclosure relates to an external connection bus bar and a wiring module.

BACKGROUND ART

A high-voltage battery pack used in an electric vehicle, a hybrid vehicle, or the like is normally formed by stacking a large number of battery cells and electrically connecting them in series or in parallel using a battery wiring module. A battery wiring module used in such a battery pack is provided with a plurality of voltage detection lines for measuring the voltage of each battery cell. Patent Document 1 describes a battery wiring module in which a plurality of voltage detection lines are formed by conductive paths on a flexible printed circuit board (FPC). Each voltage detection line (conductive path) on such a flexible circuit board is connected by soldering to a bus bar connected to an electrode of a battery cell.

CITATION LIST

Patent Documents

Patent Document 1: JP 2013-105522A

SUMMARY OF INVENTION

Technical Problem

The wiring resistance of the flexible printed circuit board increases as the wiring length of the voltage detection line (conductive path) increases, and there is a risk that the voltage of the battery will be measured lower than the actual voltage due to a voltage drop in the voltage detection line. For this reason, it is preferable that the flexible printed circuit board is installed in the battery wiring module such that the wiring length is as short as possible.

On the other hand, in the battery wiring module, for example, as shown in FIG. 6, an external connection bus bar 100 having an external connection terminal 101 for connecting to an external device is provided. The external connection terminal 101 has a larger area than the portion of the bus bar 100 that is to be connected to the electrode 105 of the battery cell in some cases.

Also, a flexible printed circuit board 104 is installed adjacent to such an external connection terminal 101 for reasons such as routing, and if the conductive path for voltage detection on the flexible printed circuit board 104 and the portion of the bus bar 100 that is adjacent to the external connection terminal 101 are connected to each other by soldering, the heat applied to the solder is easily transferred to the external connection terminal 101 and dissipated. That is, since the temperature rise rate of the solder is slow, there arises a problem in that the connection task takes time.

The present disclosure has been completed based on the above-described circumstance, and aims to provide an external connection bus bar and a wiring module in which heat applied during connection is not likely to escape toward the external connection terminal and excellent connection workability is achieved, even if a circuit board is installed adjacent to the external connection terminal.

Solution to Problem

This disclosure is an external connection bus bar that is to be connected to a storage element group having a plurality of storage elements and having an output electrode terminal for outputting electric power to an external circuit, the external connection bus bar including: a main body portion to be connected to the output electrode terminal; an external connection terminal to be connected to the external circuit; and a circuit board connection portion to be soldered to a bus bar land provided on a circuit board, in which the external connection terminal is provided between the main body portion and the circuit board connection portion.

Also, the present disclosure is a wiring module that is to be attached to a power storage element group having a plurality of power storage elements and having an output electrode terminal for outputting electric power to the outside, the wiring module including: the above-described external connection bus bar; and the circuit board to be connected to the circuit board connection portion of the external connection bus bar.

Advantageous Effects of the Invention

According to the present disclosure, an external connection bus bar and a wiring module are obtained in which heat applied during connection is not likely to escape toward an external connection terminal and excellent connection workability is achieved, even if a circuit board is installed adjacent to the external connection terminal.

DESCRIPTION OF EMBODIMENTS

Figure 1:
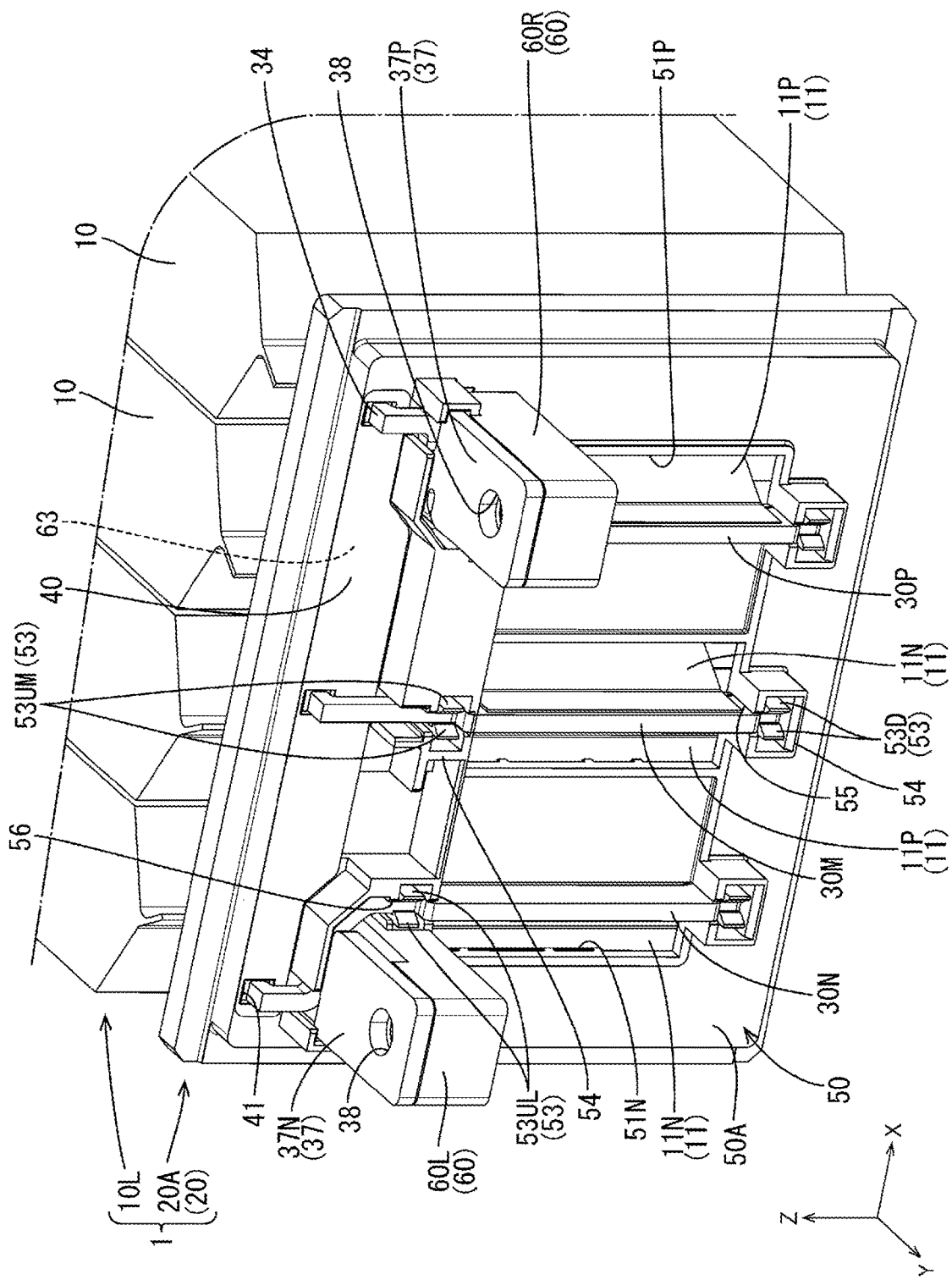
FIG. 1 is a partially enlarged perspective view of a battery wiring module according to an embodiment.

First, embodiments of the present disclosure will be listed and described.

(1) This disclosure is an external connection bus bar that is to be connected to a storage element group having a plurality of storage elements and having an output electrode terminal for outputting electric power to an external circuit, the external connection bus bar including: a main body portion to be connected to the output electrode terminal; an external connection terminal to be connected to the external circuit; and a circuit board connection portion to be soldered to a bus bar land provided on a circuit board, in which the external connection terminal is provided between the main body portion and the circuit board connection portion.

According to such a configuration, even if the circuit board connection portion and the external connection terminal are arranged adjacent to each other, when heat is applied to the connection portion to electrically connect the circuit board connection portion and the circuit board, the applied heat is less likely to escape toward the external connection terminal than in the conventional technique. As a result, the temperature of the connecting portion rises quickly, and the efficiency of the task of connecting the external connection bus bar and the circuit board to each other is improved.

(2) It is preferable that the main body portion is connected to the external connection terminal and the circuit board connection portion via a connecting portion, and the external connection terminal and the circuit board connection portion protrude in mutually different directions from the connecting portion.

According to such a configuration, when heat is applied to the connection portion to electrically connect the circuit board connection portion and the circuit board, the applied heat is less likely to escape toward the external connection terminal. That is, the efficiency of the task of connecting the external connection bus bar and the circuit board to each other is further improved.

(3) It is preferable that the body portion, the external connection terminal, and the circuit board connection portion are continuous with each other in a form obtained by bending a plate-shaped member into a crank shape, a main body portion-side plate surface of the main body portion and a circuit board connection portion-side plate surface of the circuit board connection portion are disposed parallel to each other, and an external connection terminal-side plate surface of the external connection terminal extends in a direction intersecting with the main body portion-side plate surface and the circuit board connection portion-side plate surface.

According to such a configuration, the external connection bus bar with a predetermined shape in which the main body portion-side plate surface and the circuit board connection portion-side plate surface face a different direction than the external connection terminal-side plate surface can be easily formed by merely punching out and bending a metal plate.

(4) It is preferable that a plate width of the circuit board connection portion is set smaller than a plate width of the main body portion and a plate width of the external connection terminal.

According to such a configuration, when the connection portion between the circuit board connecting portion and the circuit board is heated, the temperature of the connection portion is more likely to rise due to the applied heat, and the efficiency of the connection task is further improved.

(5) Also, the present disclosure is a wiring module to be attached to a power storage element group having a plurality of power storage elements and having an output electrode terminal for outputting electric power to the outside, including: the external connection bus bar according to any one of (1) to (4) above; and the circuit board to be connected to the circuit board connection portion of the external connection bus bar.

According to such a configuration, even if the circuit board connection portion and the external connection terminal are arranged adjacent to each other in the external connection bus bar, when heat is applied to the connection portion to electrically connect the circuit board connection portion and the circuit board, the applied heat is less likely to escape toward the external connection terminal than in the conventional technique. As a result, the temperature of the connection portion rises quickly, and the efficiency of the task of connecting the external connection bus bar and the circuit board to each other is improved.

(6) It is preferable to further include a protector including an external connection terminal holding portion for holding the external connection terminal and a circuit board holding portion for holding the circuit board, in which both the external connection terminal holding portion and the circuit board holding portion are provided adjacent to each other on one end of the protector.

According to such a configuration, the protector can stably hold the external connection bus bar and the circuit board adjacent to each other.

(7) It is preferable that the circuit board is a flexible printed circuit board. With such a configuration, the flexible printed circuit board is lightweight and flexible, and therefore the wiring module can be easily assembled.

DETAILED EMBODIMENTS OF THE DISCLOSURE

An embodiment of the present disclosure will be described with reference to FIGS. 1 to 5. The present disclosure is not limited to these examples, but is indicated by the scope of the claims, and all modifications within the meaning and range of equivalency to the scope of the claims are intended to be encompassed therein.

A battery module 1 including a battery wiring module 20 (an example of a wiring module) of the present embodiment is mounted in a vehicle such as an electric vehicle or a hybrid vehicle as a power source for driving the vehicle. In the following description, the direction indicated by arrow Z is upward, the direction indicated by arrow X is rightward, and the direction indicated by arrow Y is frontward. Note that in some cases, only some of a plurality of identical members are denoted by reference numerals, and the reference numerals of other members are omitted.

As shown in FIG. 1, the battery module 1 includes a battery cell stack 10L and a battery wiring module 20 attached to the front and rear sides of the battery cell stack 10L.

Battery Cell Stack 10L

As shown in FIG. 1, the battery cell stack 10L (an example of a storage element group) is formed by stacking a plurality of battery cells 10 in the left-right direction. A battery cell 10 (an example of a power storage element) is elongated in the front-rear direction and flattened in the left-right direction. A power storage element (not shown) is housed inside the battery cell 10. A pair of electrode leads 11 are arranged at both ends of the battery cell 10 and protrude in mutually opposite directions. The pair of electrode leads 11 are plate-shaped and have polarities opposite to each other. Electrode leads 11 of adjacent battery cells 10 have polarities opposite to each other. The electrode leads 11 protruding frontward are electrically connected by a front-side battery wiring module 20A. The electrode leads 11 protruding rearward are electrically connected by a rear-side battery wiring module.

Battery Wiring Module 20

The battery wiring module 20 includes plate-shaped bus bars 30, a flexible printed circuit board (hereinafter abbreviated as FPC) 40, and a protector 50 that holds the bus bars 30 and the FPC 40. In this embodiment, the FPC 40 is an example of a circuit board. As described above, in the battery wiring module 20, the member attached to the front side of the battery cell stack 10L is a front-side battery wiring module 20A, and the member attached to the rear side of the battery cell stack 10L is a rear-side battery wiring module (not shown). Since the rear battery wiring module has the same configuration as the front battery wiring module 20A, only the configuration of the front battery wiring module 20A will be described in detail below.

Protector 50

Figure 2:
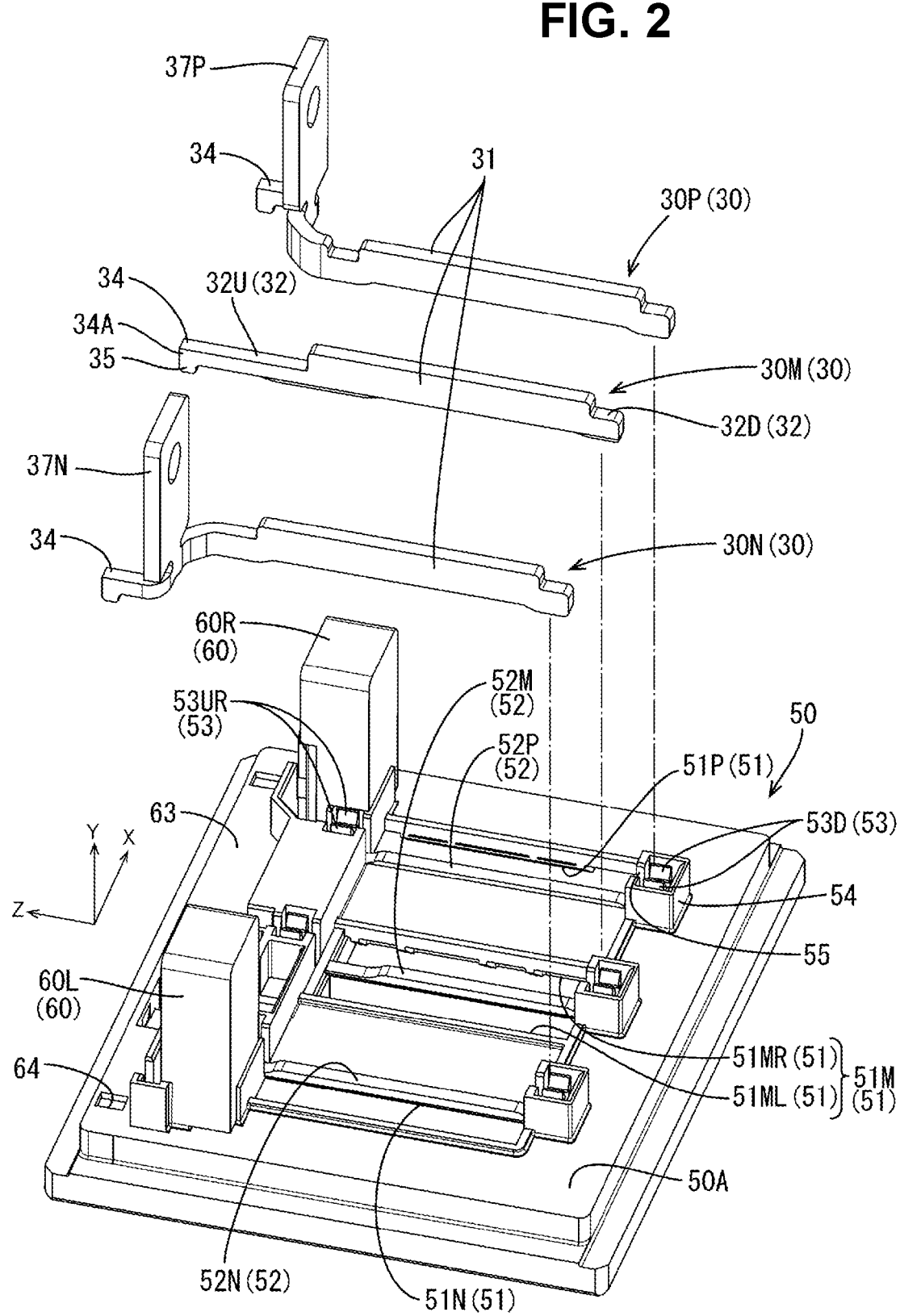
FIG. 2 is an exploded perspective view of a wiring module.

The protector 50 is made of insulating synthetic resin and has a plate shape as shown in FIG. 2. A plurality of electrode receiving portions 51 are arranged side by side in the left-right direction at the central portion in the up-down direction of the protector 50. The plurality of electrode receiving portions 51 are formed to penetrate in the front-rear direction and have vertically-elongated rectangular shapes. The plurality of electrode receiving portions 51 include a positive electrode receiving portion 51P located at the right end, a negative electrode receiving portion 51N located at the left end, and an intermediate electrode receiving portion 51M located therebetween. As shown in FIG. 1, the positive electrode receiving portion 51P is a portion that receives a positive electrode lead 11P, and the negative electrode receiving portion 51N is a portion that receives a negative electrode lead 11N. As shown in FIG. 2, the intermediate electrode receiving portion 51M is divided into a right intermediate electrode receiving portion 51MR and a left intermediate electrode receiving portion 51ML, one of which (the right intermediate electrode receiving portion 51MR) is a portion for receiving the negative electrode lead 11N, and the other of which (the left intermediate electrode receiving portion 51ML) is a portion for receiving the positive electrode lead 11P.

An intermediate contact portion 52M with which a later-described intermediate bus bar 30M comes into contact from the front is provided between the right intermediate electrode receiving portion 51MR and the left intermediate electrode receiving portion 51ML. In addition, a positive electrode contact portion 52P with which a later-described positive electrode bus bar 30P comes into contact is provided on the left edge of the positive electrode receiving portion 51P. Furthermore, a negative electrode contact portion 52N with which a later-described negative electrode bus bar 30N comes into contact is provided on the right edge of the negative electrode receiving portion 51N. Hereinafter, the intermediate contact portion 52M, the positive electrode contact portion 52P, and the negative electrode contact portion 52N are denoted by reference numeral 52 when no distinction is made therebetween. The main body portion 31 of each later-described bus bar 30 comes into contact with a contact portion 52 so as to extend in the up-down direction in a manner such that the plate surface thereof stands up from the front surface 50A of the protector 50 (in a manner such that the plate thickness direction is the left-right direction).

Locking portions 53 for locking the bus bars 30 while the bus bars 30 are in contact with the contact portions 52 are provided protruding frontward from the front surface 50A of the protector 50 above and below these contact portions 52. The locking portions 53 are disposed on both sides of the bus bar 30 with a pair of locking claws facing each other, and can lock to the end surface disposed on the frontward side of the bus bar 30. The surrounding area of these locking portions 53 is surrounded by a peripheral wall 54. A first groove portion 55 for passing the bus bar 30 extending from the contact portion 52 side between the pair of locking claws (locking portions 53) is formed in the peripheral wall 54.

Also, the peripheral wall 54 of upper locking portions 53U disposed above the contact portion 52 is provided with a second groove portion 56 for leading the upper portion of the bus bar 30 locked by the locking portion 53 further upward (see FIG. 1).

Hereinafter, the upper locking portion 53U disposed on the right side is denoted as a right upper locking portion 53UR, the upper locking portion 53U disposed on the left side is denoted as a left upper locking portion 53UL, and the upper locking portion 53U disposed between the right upper locking portion 53UR and the left upper locking portion 53UL is denoted as an intermediate upper locking portion 53UM.

As shown in FIGS. 1 to 4, a right terminal block 60R (an example of an external connection terminal holding portion) protruding frontward from the front surface 50A of the protector 50 is provided above the positive electrode receiving portion 51P and to the right of the right upper locking portion 53UR. A left terminal block 60L (an example of an external connection terminal holding portion) protruding frontward from the front surface 50A of the protector 50 is provided above the negative electrode receiving portion 51N and to the left of the left upper locking portion 53UL. In the following description, the right terminal block 60R and the left terminal block 60L will be referred to as terminal blocks 60 when no distinction is made therebetween.

Figure 3:
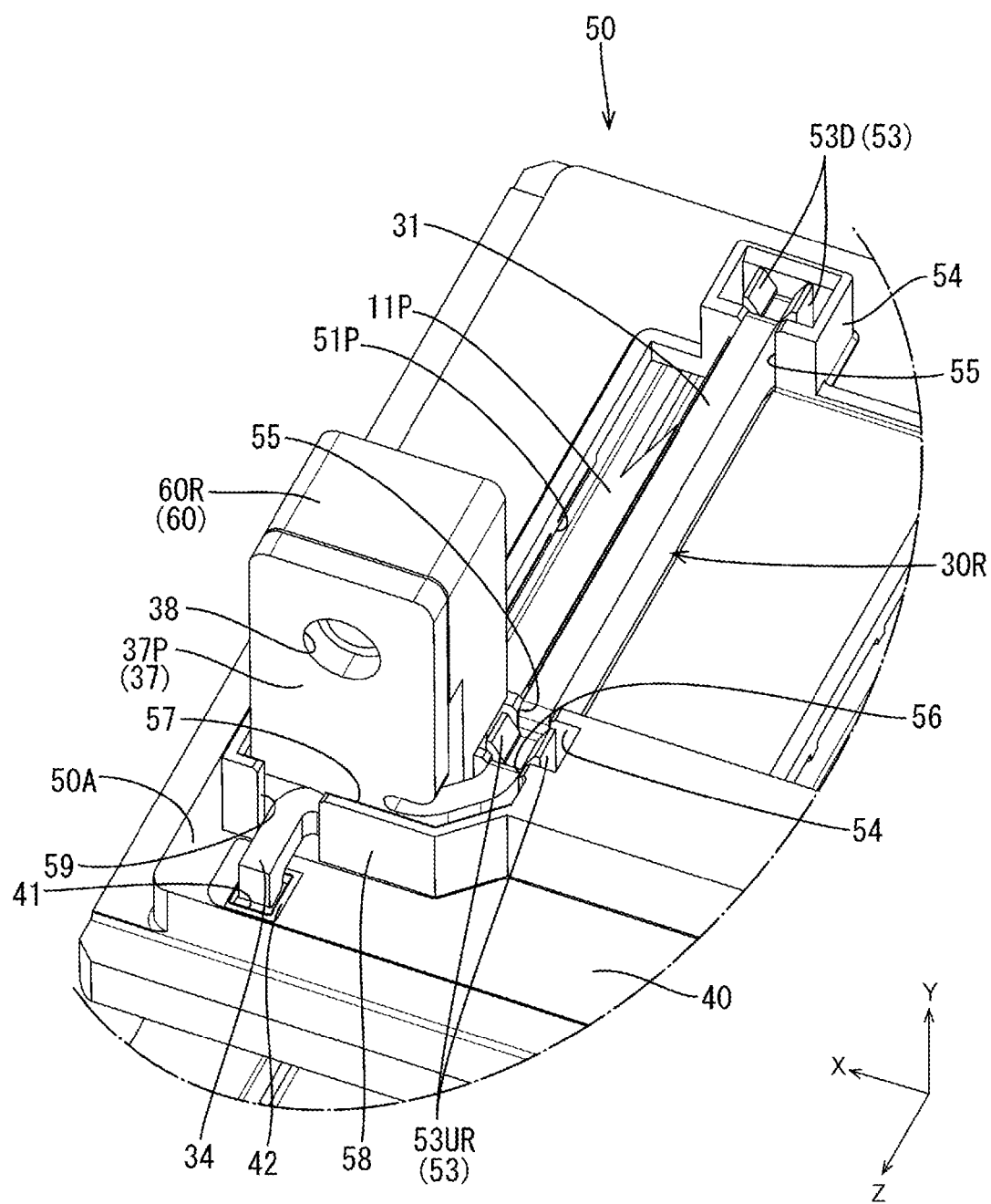
FIG. 3 is an enlarged perspective view of a main part of the wiring module.
Figure 4:
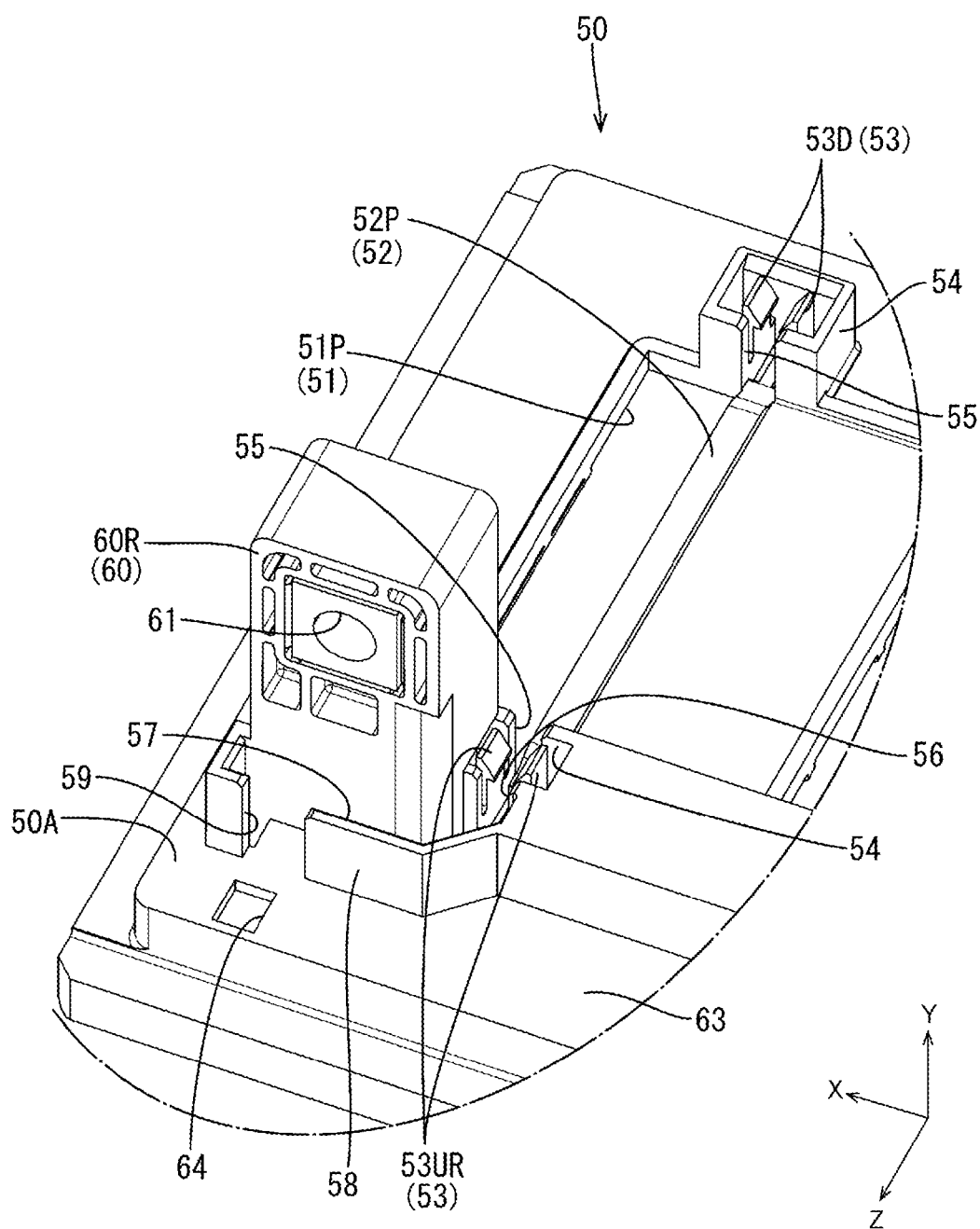
FIG. 4 is an enlarged perspective view of a main part of an insulating protector.

The upper surface of the terminal block 60 extends in the horizontal direction, and as shown in FIG. 3, a terminal portion 37 of the bus bar 30, which will be described later, can be placed on the upper surface. The terminal block 60 has a bolt fixing hole 61 exposed on its upper surface (see FIG. 4). Through the bolt fixing hole 61, a bolt can be inserted through a through hole 38 of the terminal portion 37 placed on the terminal block 60 and the through hole of a terminal of an external circuit (not shown), and the bolt can be fixed to the terminal block 60.

A guide portion 57 is provided around the terminal block 60. The guide portion 57 is a portion that guides the attachment position of the bus bar 30, which will be described later. As shown in FIG. 3, the guide portion 57 has a groove shape by which the upper end side of the bus bar 30 led upward from the upper locking portion 53U is guided along the terminal block 60 above the terminal block 60. More specifically, the protector 50 is provided with an upright wall 58 that stands up frontward from the front surface 50A and continues from the peripheral wall 54 to extend along the side surface and the upper surface of the terminal block 60, and the groove-shaped guide portion 57 is formed between the upright wall 58 and the terminal block 60.

Note that a portion of the upright wall 58 that is disposed facing the upper surface of the terminal block 60 is provided with a third groove portion 59 for leading an FPC connection portion 34 of the bus bar 30 (described later) upward (see FIG. 3).

As shown in FIGS. 1 and 2, a region that is adjacent to the terminal block 60 on an upper portion (one end side) of the front surface 50A of the protector 50 is an FPC holding portion 63 (an example of a circuit board holding portion) for installing an FPC 40 over the entire left-right direction. The FPC holding portion 63 is provided with a plurality of positioning recesses 64 for receiving the leading ends of positioning protrusions 35 of the bus bars 30, which will be described later, and for positioning the bus bars 30 with respect to the protector 50 (see FIGS. 2 and 4). Each of the positioning recesses 64 has a rectangular shape and is recessed rearward from the front surface 50A of the protector 50. The positioning recesses 64 are provided on the right side of the positive electrode receiving portion 51P and above the right terminal block 60R, above the intermediate upper locking portion 53UM, and on the left side of the negative electrode receiving portion 51N and above the left terminal block 60L. These positioning recesses 64 are arranged in a row in the left-right direction.

Flexible Printed Circuit Board 40

The FPC 40 includes a base film, a coverlay film, and a plurality of conductive paths (none of which are shown in the drawings). The base film and coverlay film are made of a synthetic resin such as polyimide, which has an insulating property and is flexible. The conductive path is made of metal foil such as copper or a copper alloy. Although illustration and description are omitted below, any electronic components such as resistors, capacitors, and transistors can be connected to the conductive paths. As shown in FIGS. 1 and 3, the FPC 40 is fixed to the front surface 50A (FPC holding portion 63) of the protector 50 such that the plate thickness direction is the front-rear direction.

Rectangular connection holes 41 are formed through the FPC 40 in the plate thickness direction. The connection holes 41 are formed at positions corresponding to the positioning recesses 64 of the protector 50 when the FPC 40 is fixed to the FPC holding portion 63 of the protector 50. Bus bar lands 42 connected to the ends of the conductive paths are provided at the edges of the connection holes 41 (see FIG. 3). The bus bar lands 42 may be formed at least partly around the connection holes 41. In FIG. 3, the bus bar land 42 is provided on the left side of the connection hole 41 so as to be in contact with the three sides of the rectangle forming the edge of the connection hole 41, but the bus bar land 42 may also be provided so as to be in contact with only one side on the left side of the rectangle forming the edge of the connection hole 41. The bus bar land 42 is made of metal foil that is the same as that of the conductive path. The bus bar land 42 is a portion to which the FPC connection portion 34 of the bus bar 30, which will be described later, is electrically connected by soldering.

Bus Bar 30, Positive Electrode Bus Bar 30P, Negative Electrode Bus Bar 30N, Intermediate Bus Bar 30M As shown in FIG. 1, the front battery wiring module 20A includes, as the bus bars 30, a positive electrode bus bar 30P (an example of an external connection bus bar) located at the right end, a negative electrode bus bar 30N (an example of an external connection bus bar) located at the left end, and an intermediate bus bar 30M located at an intermediate portion. On the other hand, the rear battery wiring module (not shown) has only the intermediate bus bar 30M as the bus bar 30. Hereinafter, the positive electrode bus bar 30P, the negative electrode bus bar 30N, and the intermediate bus bar 30M will be simply referred to as the bus bars 30 when no distinction is made therebetween. As described above, the bus bars 30 are attached to the protector 50 in such a manner that the plate surfaces stand up from the front surface 50A of the protector 50 (in such a manner that the plate thickness direction is the left-right direction).

The bus bars 30 are formed by machining conductive metal plates. The bus bars 30 each include a main body portion 31 to be connected to an electrode lead 11, a pair of locked portions 32 to be locked to the locking portions 53 of the protector 50, and an FPC connection portion 34 (an example of a circuit board connection portion) to be connected to the FPC 40. This configuration is held in common by the positive electrode bus bar 30P, the negative electrode bus bar 30N, and the intermediate bus bar 30M. Detailed configurations of the positive electrode bus bar 30P, the negative electrode bus bar 30N, and the intermediate bus bar 30M will be described below.

First, the intermediate bus bar 30M will be described. As shown in FIG. 2, the intermediate bus bar 30M has a flat plate shape overall, and the central portion in the up-down direction is the main body portion 31. The length in the up-down direction of the main body portion 31 is greater than the length in the up-down direction of the positive electrode lead 11P and the negative electrode lead 11N. One side (right side) of the main body portion 31 is connected to the negative electrode lead 11N, and the other side (left side) is connected to the positive electrode lead 11P (see FIG. 1).

As shown in FIG. 2, a lower locked portion 32D that is locked to the lower locking portion 53D of the protector 50 is provided below the main body portion 31 (on the right side in FIG. 2). The lower locked portion 32D is narrower than the main body portion 31 because the front end surface side is cut out from the main body portion 31 in a stepped shape. The lower locked portion 32D can be prevented from coming off to the front side due to the locking claw of the lower locking portions 53D being locked to the cut-out front end surface from the front (upper side in FIG. 2). An upper locked portion 32U is provided above the main body portion 31 (on the left side in FIG. 2). The upper locked portion 32U is also narrower than the main body portion 31 due to the front end surface side being cut out from the main body portion 31 in a stepped shape, and the locking claws of the upper locking portions 53U can lock from the front.

Above the upper locked portion 32U, an FPC connection portion 34 having the same width as the upper locked portion 32U and extending linearly upward is provided, and the plate surface (surface facing the left-right direction; hereinafter, the leading end plate surface 34A) on the leading end portion (upper end) thereof is a portion connected to the bus bar land 42 of the FPC 40. Also, a positioning protrusion 35 that protrudes rearward (downward in FIG. 2) from the rear surfaces of the main body portion 31 and the locked portion 32 is provided at the leading end of the FPC connection portion 34. The outer diameter of the positioning protrusion 35 is set smaller than the inner diameter of the connection hole 41 of the FPC 40 and the positioning recess 64 of the protector 50.

In a state in which the body portion 31 of the intermediate bus bar 30M is in contact with the intermediate contact portion 52M of the protector 50, the pair of locked portions 32 are disposed at positions corresponding to the pair of locking portions 53 of the protector 50, the positioning protrusions 35 of the FPC connection portion 34 are disposed at positions corresponding to the connection holes 41 of the FPC 40 and the positioning recesses 64 of the protector 50.

Figure 5:
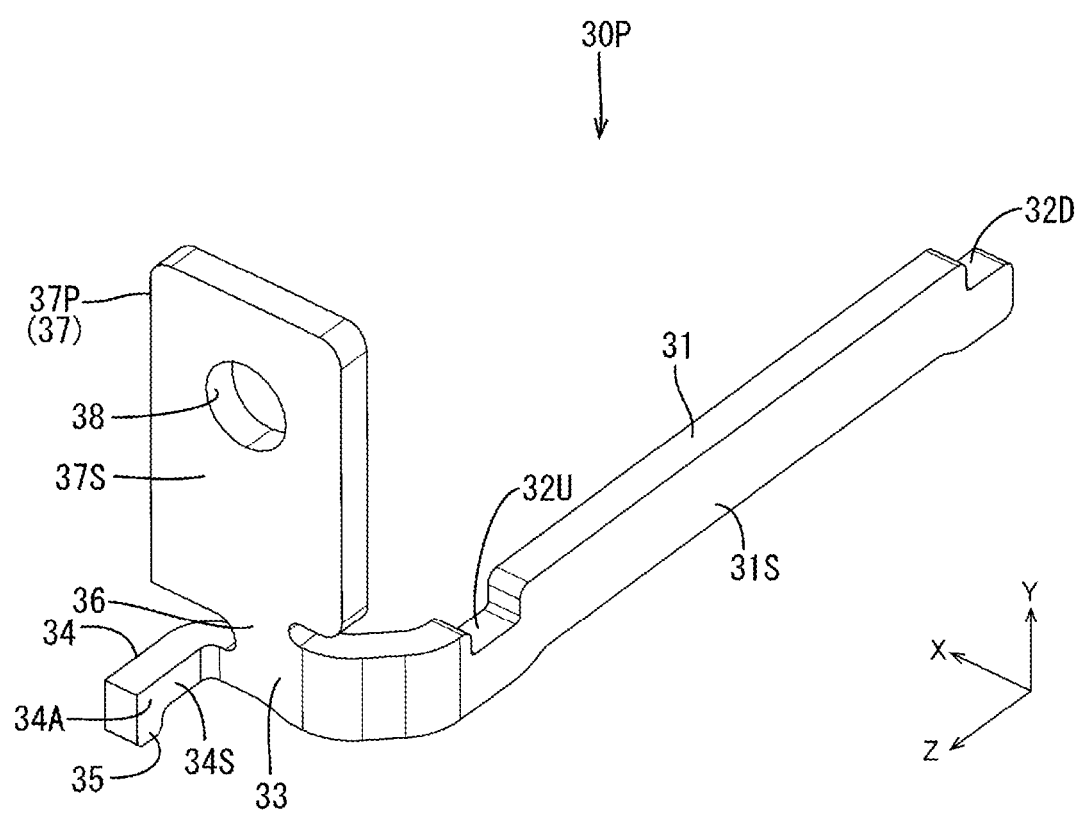
FIG. 5 is a perspective view of an external connection bus bar.
Figure 6:
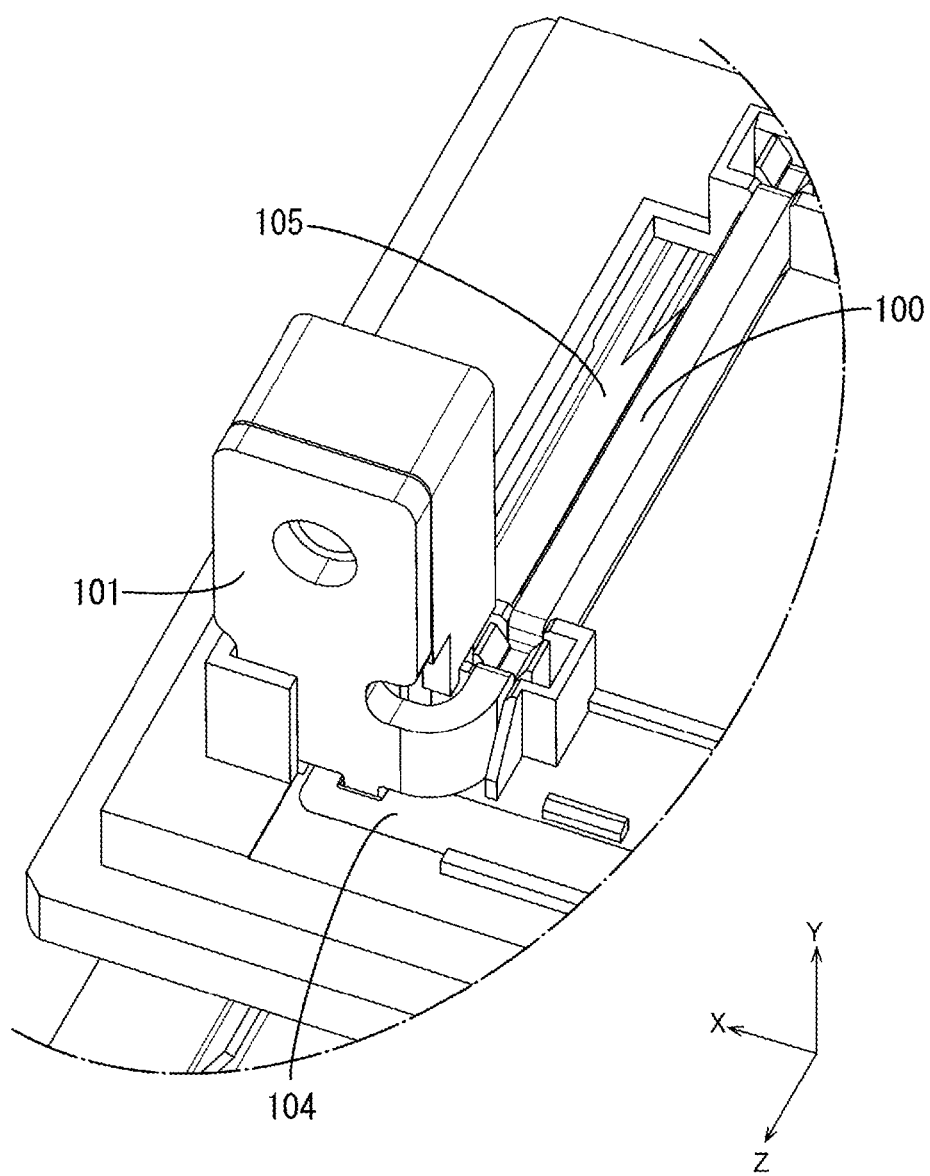
FIG. 6 is an enlarged perspective view of a main part of a conventional wiring module.

Next, the positive electrode bus bar 30P will be described. As shown in FIG. 5, the positive electrode bus bar 30P includes a main body portion 31, a pair of locked portions 32 that are locked to the locking portion 53 of the protector 50, an FPC connection portion 34, and a terminal portion 37P (an example of an external connection terminal) that is to be connected to an external device.

The body portion 31 is a substantially central portion in the up-down direction of the positive electrode bus bar 30P, and the positive electrode lead 11P is connected thereto. The lower locked portion 32D that is locked by the lower locking portions 53D of the above-described protector 50 is provided below the body portion 31 (the upper right side in FIG. 5). An upper locked portion 32U to which the right upper locking portions 53UR are locked is provided above the main body portion 31. The main body portion 31 and the pair of locked portions 32U, 32D of the positive electrode bus bar 30P have substantially the same shape as the main body portion 31 and the pair of locked portions 32U, 32D of the intermediate bus bar 30M (see FIG. 2). The plate width (width in the front-rear direction) of the pair of locked portions 32U, 32D is narrower than the plate width of the main body portion 31.

The portion of the positive electrode bus bar 30P above the upper locked portion 32U is a connecting portion 33 that curves rightward and extends in the horizontal direction (rightward). The leading end of the connecting portion 33 (the end opposite to the upper locked portion 32U) is an FPC connecting portion 34 (an example of a circuit board connecting portion) that curves upward and extends in the vertical direction. That is, the FPC connection portion 34 extends from the main body portion 31 side via the upper locked portion 32U and the connecting portion 33.

A plate surface (a surface facing the left-right direction; hereinafter referred to as a leading end plate surface 34A) at the leading end (upper end) of the FPC connection portion 34 is a portion connected to the bus bar land 42 of the FPC 40. A positioning protrusion 35 that protrudes rearward is provided at the leading end of the FPC connection portion 34.

Note that the plate width (the width in the front-rear direction) of the connecting portion 33 is substantially the same as the plate width of the main body portion 31. On the other hand, the plate width of the FPC connection portion 34 (the width in the front-rear direction, not including the positioning protrusion 35) is smaller than the plate width of the main body portion 31 and the plate width of the connecting portion 33.

A rectangular flat terminal portion 37P (an example of an external connection terminal) is formed protruding frontward (upward in FIG. 5) via a neck portion 36 on the connecting portion 33. The terminal portion 37P is provided between the main body portion 31 and the FPC connection portion 34. The terminal portion 37P extends from the main body portion 31 side via the upper locked portion 32U and the connecting portion 33. The terminal portion 37P protrudes from the connecting portion 33 in a direction different from that of the FPC connection portion 34.

The plate surface of the terminal portion 37P extends in the horizontal direction. A through hole 38 that is in communication with the bolt fixing hole 61 of the right terminal block 60R when the terminal portion 37P is placed on the right terminal block 60R is formed in the center portion of the terminal portion 37P. Note that the plate width of the terminal portion 37P (width in the left-right direction) is greater than the plate width of the neck portion 36 (width in the left-right direction) and the plate width of the connecting portion 33 (width in the front-rear direction).

In the positive electrode bus bar 30P, the body portion 31, the upper locked portion 32U, the connecting portion 33, the terminal portion 37P extending frontward from the connecting portion 33, and the FPC connection portion 34 are continuous with each other in a form obtained by bending a plate member into a crank shape. That is, the plate surface 31S of the main body portion 31 (an example of the main body portion-side plate surface) and the plate surface 34S of the FPC connection portion 34 (an example of the circuit board connection portion-side plate surface) extend in the front-rear and up-down directions, whereas the plate surface 37S (an example of an external connection terminal-side plate surface) of the connecting portion 33 and the terminal portion 37P extends in the front-rear and left-right directions. In this manner, the plate surface 31S of the main body portion 31 and plate surface 34S of the FPC connection portion 34 extend in a direction intersecting with the plate surface 37S of the terminal portion 37P.

The positive electrode bus bar 30P is connected to the positive electrode lead 11P (an example of an output electrode terminal) on the right end in the battery cell stack 10L (see FIG. 1), and the terminal portion 37P functions as the positive electrode of the battery module 1.

On the other hand, the negative electrode bus bar 30N has an overall shape in which the positive electrode bus bar 30P is substantially inverted horizontally. Specifically, in the above-described positive electrode bus bar 30P the upper portion of the upper locked portion 32U is the connecting portion 33 that is curved to the right and extends in the horizontal direction, whereas in the negative electrode bus bar 30N, the upper portion of the upper locked portion 32U forms a connecting portion 33 that is curved leftward and extends in the horizontal direction. Note that the plate width of the connecting portion 33 of the negative electrode bus bar 30N is made equal to the plate width of the upper locked portion 32U of the negative electrode bus bar 30N. Other configurations are the same as those of positive electrode bus bar 30P.

The negative electrode bus bar 30N is connected to the negative electrode lead 11N (an example of an output electrode terminal) on the left end in the battery cell stack 10L (see FIG. 1), and the terminal portion 37N functions as the negative electrode of the battery module 1.

Next, a method for assembling the front battery wiring module 20A will be described. First, the FPC 40 is attached to the FPC holding portion 63 of the protector 50. Then, the main body portions 31 of positive electrode bus bar 30P, the intermediate bus bar 30M, and negative electrode bus bar 30N are brought into contact with the contact portions 52 such that the plate surfaces stand up from the front surface 50A of protector 50. Then, the pairs of locked portions 32 of the bus bars 30 are locked by the pairs of locking portions 53 of the protector 50. In this state, the connecting portions 33 of the positive electrode bus bar 30P and the negative electrode bus bar 30N are guided by the guide portions 57, the terminal portions 37 are placed on the upper surfaces of the terminal blocks 60, and the FPC connection portion 34 is led to the FPC holding portion 63 by the third groove portion 59. Then, the positioning protrusion 35 at the leading end of the FPC connection portion 34 is fitted into the connection hole 41 of the FPC 40 and the positioning recess 64 of the protector 50. As a result, the bus bars 30 are attached to protector 50 at regular positions.

After each bus bar 30 is attached to the protector 50 in this manner, the leading end plate surface 34A of the FPC connection portion 34 of each bus bar 30 is soldered to the bus bar land 42. At this time, the FPC connection portions 34 of the positive electrode bus bar 30P and the negative electrode bus bar 30N are arranged adjacent to the terminal portions 37P, 37N on one end (the upper side) of the protector 50, and there is a risk that the heat applied to the solder will be transferred to the terminal portion 37 with a large area and dissipated. However, in the positive electrode bus bar 30P and the negative electrode bus bar 30N of the present embodiment, the FPC connection portion 34 and the terminal portion 37 respectively protrude from the main body portion 31 via the connecting portion 33 in different directions and therefore heat transfer to the terminal portion 37 is suppressed.

Finally, the positive electrode lead 11P and the negative electrode lead 11N are inserted into the electrode receiving portion 51, are bent so as to come into contact with the main body portions 31 of the bus bars 30, and then are connected to the bus bars 30 through laser welding. Accordingly, the battery wiring module is connected to the battery cell stack 10L.

Operations and Effects of the Embodiment

According to the embodiment described above, the following operations and effects are obtained.

(1) The external connection bus bars according to the embodiment are a positive electrode bus bar 30P and a negative electrode bus bar 30N that are to be connected to a battery cell stack 10L having a plurality of battery cells 10 and having an electrode lead 11 for outputting power to an external circuit, each including a main body portion 31 to be connected to the electrode lead 11, a terminal portion 37 to be connected to an external circuit, and an FPC connection portion 34 to be soldered to a bus bar land 42 provided on the FPC 40, in which the terminal portion 37 is provided between the body portion 31 and the FPC connection portion 34.

According to such a configuration, even if the FPC connection portion 34 and the terminal portion 37 are arranged adjacent to each other, when heat is applied to the connection portion to electrically connect the FPC connection portion 34 and the FPC 40, the applied heat is less likely to escape toward the terminal portion 37 side than in the conventional technique. As a result, the temperature of the connection portion rises quickly, and the efficiency of the task of connecting the bus bar 30 and the FPC 40 to each other is improved.

(2) In the embodiment, the body portion 31, the terminal portion 37, and the FPC connection portion 34 are connected to each other via the connecting portion 33, and the terminal portion 37 and the FPC connection portion 34 protrude in mutually different directions from the connecting portion 33.

According to such a configuration, when heat is applied to the connection portion to electrically connect the FPC connection portion 34 and the FPC 40 to each other, the applied heat is less likely to escape toward the terminal portion 37. That is, the efficiency of the task of connecting the bus bar 30 and the FPC 40 to each other is further improved.

(3) In the embodiment, the body portion 31, the terminal portion 37, and the FPC connection portion 34 are continuous with each other in a form obtained by bending the plate-like member into a crank shape, the plate surface 31S of the body portion 31 and the plate surface 34S of the FPC connection portion 34 are disposed parallel to each other, and the plate surface 37S of the terminal portion 37 extends in a direction intersecting with the plate surface 31S of the main body portion 31 and the plate surface 34S of the FPC connection portion 34.

According to such a configuration, it is possible to easily form a bus bar 30 with a predetermined shape in which the plate surface 31S of the main body portion 31 and the plate surface 34S of the FPC connection portion 34 face a direction different from that of the plate surface 37S of the terminal portion 37 by merely punching out and bending a metal plate.

(4) In the embodiment, the plate width of the FPC connection portion 34 is set smaller than the plate width of the body portion 31 and the plate width of the terminal portion 37.

According to such a configuration, when the connection portion between the leading end plate surface 34A of the FPC connecting portion 34 and the FPC 40 is heated, the temperature of the connecting portion is more likely to rise due to the heat applied, and the efficiency of the connection task is further improved.

(5) The battery wiring module 20 according to the embodiment has a plurality of battery cells 10 and is attached to the battery cell stack 10L having an electrode lead 11 for outputting electric power to the outside, and includes the bus bars 30 according to any one of (1) to (4) above and the FPC 40 connected to the FPC connection portion 34 of the bus bars 30.

According to such a configuration, even if the FPC connection portion 34 and the terminal portion 37 are arranged adjacent to each other in the bus bar 30, when heat is applied to the connection portion to electrically connect the FPC connection portion 34 and the FPC 40, the applied heat is less likely to escape toward the terminal portion 37 compared to the conventional technique. As a result, the temperature of the connection portion rises quickly, and the efficiency of the task of connecting the bus bar 30 and the FPC 40 to each other is improved.

(6) A protector 50 is included, which includes a terminal block 60 that holds the terminal portion 37 and an FPC holding portion 63 that holds the FPC 40, and both the terminal block 60 and the FPC holding portion 63 are provided adjacent to each other on one end of the protector 50.

According to such a configuration, the protector 50 can stably hold the bus bar 30 and the FPC 40 adjacent to each other.

(7) In addition, since the FPC 40 is lightweight and flexible, assembly of the battery wiring module 20 is easier.

OTHER EMBODIMENTS (1) The main body, the external connection terminals, and the circuit board connection portion do not need to be in a form obtained by bending a plate-like member into a crank shape, and may be in any form as long as the external connection terminal is provided between the main body portion and the circuit board connection portion.

(2) The main body portion, the external connection terminals, and the circuit board connection portion do not need to be continuous with each other in a crank shape, and in short, the external connection terminal and the circuit board connection portion preferably protrude in mutually different directions.

1 Battery module
10 Battery cell (power storage element)
10L Battery cell stack (power storage element group)
11 Electrode lead (output electrode element)
11N Negative electrode lead (output electrode element)
11P Positive electrode lead (output electrode element)
20 Battery wiring module (wiring module)
20A Front battery wiring module (wiring module)
30 Bus bar
30M Intermediate bus bar
30N Negative electrode bus bar (external connection bus bar)
30P Positive electrode bus bar (external connection bus bar)
31 Main body portion
31S Plate surface (main body portion-side plate surface)
32 Locked portion
32D Lower locked portion
32U Upper locked portion
33 Connecting portion 34 FPC connection portion (circuit board connection portion)
34A Leading end plate surface
34S Plate surface (circuit board connection portion-side plate surface)
35 Positioning protrusion
36 Neck portion
37, 37N, 37P Terminal portion (external connection terminal)
37S Plate surface (external terminal connection terminal-side portion side plate surface)
38 Through hole
40 FPC (circuit board)
41 Connection hole
42 Bus bar land
50 Protector
50A Front surface
51 Electrode receiving portion
51M Intermediate electrode receiving portion
51ML Left intermediate electrode receiving portion
51MR Right intermediate electrode receiving portion
51N Negative electrode receiving portion
51P Positive electrode receiving portion
52 Contact portion
52M Intermediate contact portion
52N Negative contact portion
52P Positive contact portion
53 Locking portion
53D Lower locking portion
53U Upper locking portion
53UL Left upper locking portion
53UM Intermediate upper locking portion
53UR Right upper locking portion
54 Peripheral wall
55 First groove portion
56 Second groove portion
57 Guide portion
58 Upright wall
59 Third groove portion
60 Terminal block (external connection terminal holding portion)
60L Left terminal block (external connection terminal holding portion)
60R Right terminal block (external connection terminal holding portion)
61 Bolt fixing hole
63 FPC holding portion (circuit board holding portion)
64 Positioning recess

The invention claimed is:

1. An external connection bus bar configured to be connected to a storage element group having a plurality of storage elements and having an output electrode terminal for outputting electric power to an external circuit, the external connection bus bar comprising:
a main body portion having a longitudinal axis and configured to be connected to the output electrode terminal;
an external connection terminal configured to be connected to the external circuit; and
a circuit board connection portion configured to be soldered to a bus bar land provided on a circuit board,
wherein, in a direction of the longitudinal axis, the external connection terminal is provided between the main body portion and the circuit board connection portion.

2. The external connection bus bar according to claim 1, wherein the main body portion is connected to the external connection terminal and the circuit board connection portion via a connecting portion, and the external connection terminal and the circuit board connection portion protrude in mutually different directions from the connecting portion.

3. The external connection bus bar according to claim 1, wherein a plate width of the circuit board connection portion is smaller than a plate width of the main body portion and a plate width of the external connection terminal.

4. A wiring module configured to be attached to the storage element group having the plurality of storage elements and having the output electrode terminal for outputting the electric power to the outside, the wiring module comprising:
the external connection bus bar according to claim 1; and
the circuit board to be connected to the circuit board connection portion of the external connection bus bar.

5. The wiring module according to claim 4, further comprising a protector including an external connection terminal holding portion for holding the external connection terminal and a circuit board holding portion for holding the circuit board, wherein both the external connection terminal holding portion and the circuit board holding portion are provided adjacent to each other on one end of the protector.

6. The wiring module according to claim 4, wherein the circuit board is a flexible printed circuit board.

7. An external connection bus bar configured to be connected to a storage element group having a plurality of storage elements and having an output electrode terminal for outputting electric power to an external circuit, the external connection bus bar comprising:
a main body portion configured to be connected to the output electrode terminal;
an external connection terminal configured to be connected to the external circuit; and
a circuit board connection portion configured to be soldered to a bus bar land provided on a circuit board,
wherein the external connection terminal is provided between the main body portion and the circuit board connection portion,
wherein the main body portion, the external connection terminal, and the circuit board connection portion are continuous with each other in a form obtained by bending a plate-shaped member into a crank shape, a main body portion-side plate surface of the main body portion and a circuit board connection portion-side plate surface of the circuit board connection portion are disposed parallel to each other, and an external connection terminal-side plate surface of the external connection terminal extends in a direction intersecting with the main body portion-side plate surface and the circuit board connection portion-side plate surface.

* * * * *